US007022165B2

(12) United States Patent
Paglieri et al.

(10) Patent No.: US 7,022,165 B2
(45) Date of Patent: Apr. 4, 2006

(54) TUBULAR HYDROGEN PERMEABLE METAL FOIL MEMBRANE AND METHOD OF FABRICATION

(75) Inventors: Stephen N. Paglieri, White Rock, NM (US); Stephen A. Birdsell, Los Alamos, NM (US); Robert S. Barbero, Santa Cruz, NM (US); Ronny C. Snow, Los Alamos, NM (US); Frank M. Smith, Espanola, NM (US)

(73) Assignee: The Regents of the University of California, Oakland, CA (US)

( * ) Notice: Subject to any disclaimer, the term of this patent is extended or adjusted under 35 U.S.C. 154(b) by 176 days.

(21) Appl. No.: 10/652,574

(22) Filed: Aug. 29, 2003

(65) Prior Publication Data

US 2005/0045034 A1 Mar. 3, 2005

(51) Int. Cl.
*B01D 53/22* (2006.01)
*B01D 69/04* (2006.01)
*B01D 71/02* (2006.01)

(52) U.S. Cl. .................... 96/10; 95/56; 96/11; 29/463; 29/890.044

(58) Field of Classification Search ................ 29/33 B, 29/33 D, 463, 890.043, 890.044; 95/56; 96/8, 10, 11; 55/DIG. 5
See application file for complete search history.

(56) References Cited

U.S. PATENT DOCUMENTS 2,456,163 A * 12/1948 Watson ...................... 73/31.04
2,958,391 A * 11/1960 Derosset ........................ 95/56
3,350,845 A * 11/1967 McKinley ...................... 95/56
3,350,846 A * 11/1967 Makrides et al. .............. 95/56
3,393,098 A * 7/1968 Hartner et al. ................ 429/13
3,779,583 A * 12/1973 Nuber ......................... 285/48
3,820,222 A * 6/1974 Lieberman ............. 29/890.031
3,957,534 A * 5/1976 Linkohr et al. ............. 429/247
4,468,235 A * 8/1984 Hill .............................. 95/46
4,496,373 A * 1/1985 Behr et al. .................. 205/354
5,139,541 A * 8/1992 Edlund .......................... 95/56

(Continued)

FOREIGN PATENT DOCUMENTS

RU 2 136 362 C1 9/1999

OTHER PUBLICATIONS

Holleck, G.L. Hydrogen Diffusion through (Palladium—Silver)-Tantalum-(Palladium—Silver) Composites. J. Phys. Chem. 1970, 74 (9), 1957.

(Continued)

*Primary Examiner*—Robert H. Spitzer
(74) *Attorney, Agent, or Firm*—John P. O'Banion; James M. Ritchey

(57) ABSTRACT

A tubular hydrogen permeable metal membrane and fabrication process comprises obtaining a metal alloy foil having two surfaces, coating the surfaces with a metal or metal alloy catalytic layer to produce a hydrogen permeable metal membrane, sizing the membrane into a sheet with two long edges, wrapping the membrane around an elongated expandable rod with the two long edges aligned and overlapping to facilitate welding of the two together, placing the foil wrapped rod into a surrounding fixture housing with the two aligned and overlapping foil edges accessible through an elongated aperture in the surrounding fixture housing, expanding the elongated expandable rod within the surrounding fixture housing to tighten the foil about the expanded rod, welding the two long overlapping foil edges to one another generating a tubular membrane, and removing the tubular membrane from within the surrounding fixture housing and the expandable rod from with the tubular membrane.

25 Claims, 7 Drawing Sheets

U.S. PATENT DOCUMENTS

| | | | | | |
|---|---|---|---|---|---|
| 5,149,420 | A | * | 9/1992 | Buxbaum et al. | 205/219 |
| 5,181,941 | A | * | 1/1993 | Najjar et al. | 95/50 |
| 5,205,841 | A | * | 4/1993 | Vaiman | 95/46 |
| 5,215,729 | A | * | 6/1993 | Buxbaum | 423/248 |
| 5,217,506 | A | * | 6/1993 | Edlund et al. | 95/56 |
| 5,259,870 | A | * | 11/1993 | Edlund | 95/56 |
| 5,358,553 | A | * | 10/1994 | Najjar et al. | 96/11 |
| 5,393,325 | A | * | 2/1995 | Edlund | 95/56 |
| 5,498,278 | A | * | 3/1996 | Edlund | 96/11 |
| 5,614,001 | A | * | 3/1997 | Kosaka et al. | 96/10 |
| 5,644,829 | A | * | 7/1997 | Mason et al. | 29/421.1 |
| 5,645,626 | A | * | 7/1997 | Edlund et al. | 95/56 |
| 5,738,708 | A | * | 4/1998 | Peachey et al. | 95/56 |
| 5,782,960 | A | * | 7/1998 | Ogawa et al. | 96/11 |
| 5,888,273 | A | * | 3/1999 | Buxbaum | 95/56 |
| 5,931,987 | A | * | 8/1999 | Buxbaum | 95/55 |
| 6,152,987 | A | * | 11/2000 | Ma et al. | 95/56 |
| 6,183,543 | B1 | * | 2/2001 | Buxbuam | 96/11 |
| 6,214,090 | B1 | * | 4/2001 | Dye et al. | 95/56 |
| 6,267,801 | B1 | * | 7/2001 | Baake et al. | 95/56 |
| 6,461,408 | B1 | * | 10/2002 | Buxbaum | 95/55 |

OTHER PUBLICATIONS

Boes, N.; Züchner, H. Diffusion of Hydrogen and Deuterium in Ta, Nb, and V. Phys. stat. sol. (a) 1973, 17, K111.

Boes, N.; Züchner, H. Application of Electrochemical Techniques for Studying Diffusion of Hydrogen Isotopes in V, Nb and Ta. Zeitschrift für Naturforschung A 1976, 31, 760.

Boes, N.; Züchner, H. Preparation of Hydrogen Permeable Foils of V, Nb and Ta by Means of Ultra High Vacuum Techniques, Zeitschrift für Naturforschung A 1976, 31, 754.

Boes, N.; Züchner, H. Secondary ion mass spectrometry and Auger electron spectroscopy investigations of Vb metal foils prepared for hydrogen permeation measurements. Surf. Tech. 178, 7, 401.chniques. Zeitschrift für Naturforschung A 1976, 31, 754.

Züchner, H. Multilayer problems in studying the diffusion of hydrogen in metals by time-lag techniques. Trans. JIM (Trans. JIM) 1980, 21 (supplement), 101.

Buxbaum, R.E. The use of Zirconium-Palladium Windows for the Separation of Tritium from the Liquid Metal Breeder-Blanket of a Fusion Reactor. Sep. Sci. Tech. 1983, 18 (12 & 13), 1251.

Hsu, C.; Buxbaum; R.E. Palladium-catalyzed oxidative diffusion for tritium extraction from breeder-blanket fluids at low concentrations. J. Nucl. Mater. 1986, 141-143, 238.

Weirich, W.; Biallas, B.; Kügler, B.; Oertel, M.; Pietsch, M.; Winkelmann, U. Development of a laboratory cycle for a thermochemical water-splitting process (Me/MeH cycle). Int. J. Hydrogen Energy 1986, 11 (7), 459.

Nishimura, C.; Komaki, M.; Amano, M. Hydrogen Permeation Characteristcs of Vanadium-Nickel Alloys. Mater. Trans., JIM 1991, 32 (5), 501.

Amano, M.; Komaki, M.; Nishimura, C. Hydrogen permeation characteristic of palladium-plated V-Ni alloy membranes. J. Less-Common met. 1991, 172-174, 727.

Katsuta, H.; McLellan, R.B.; Furukawa, K. Diffusivity and Permeability fo Hydrogen in Vanadium. Trans. JIM (Trans. JIM) 1980, 21 (supplement), 113.

Buxbaum, R.E.; Hsu, P.C. Measurement of diffusive and surface transport resistances for deuterium in palladium-coated zirconium membranes, J. Nucl. Mater. 1992, 189 (1), 183.

Buxbaum, R.E.; Marker, T.L. Hydrogen transport through non-porous membranes of palladium-coated niobium, tantalum and vanadium. J. Membr. Sci. 1993, 85, 29.

Edlund, D.J.; McCarthy, J. The relationship between intermetallic diffusion and flux decline in composite-metal membranes: implications for achieving long membrane lifetime. J. Membr. Sci. 1995, 107, 147.

Buxbaum, R.E.; Kinney, A.B. Hydrogen Transport through Tubular Membranes of Palladium-Coated Tantalum and Niobium. Ind. Eng. Chem. Res. 1996, 35, 530.

Buxbaum, R.E.; Subramanian, R.; Park, J.H.; Smith, D.L. Hydrogen transport and embrittlement for palladium coated vanadium—chromium—titanium alloys. J. Nucl. Mater. 1996, 233-237, 510.

Romanenko, O.G.; Tazhibaeva, I.L.; Shestakov, V.P.; Klepikov, A.K.; Chikhray, Y.V.; Golossanov, A.V.; Kolbasov, B.N. Hydrogen gas driven permeation through vanadium alloy VCr6Ti5. J. Nucl. Mater. 1996, 233-237, 376.

Peachey, N.M.; Dye, R.C. High temperature efforts at Los Alamos National Laboratory, DE96011306; Los Alamos National Laboratory: Los Alamos, New Mexico, US, 1995.

Peachey, N.M.; Snow, R.C.; Dye, R.C. Composite Pd/Ta metal membranes for hydrogen separation. J. Membr. Sci. 1996, 111, 123.

Moss, T.S.; Dye, R.C. Engineering materials for hydrogen separation, DE97002456; Los Alamos National Laboratory: Los Alamos, New Mexico, US, 1996.

Moss, T.S.; Dye, R.C. Composite Metal Membranes for Hydrogen Separation Applications, DE97007586; Los Alamos National Laboratory: Los Alamos, New Mexico, US, 1997.

Dye, R.C.; Birdsell, S.A.; Snow, R.C.; Moss, T.S.; Peachey, N. Advancing the Technology Base for High-Temperature Membranes, DE98000093; Los Alamos National Laboratory: Los Alamos, New Mexico, US, 1997.

Moss, T.S.; Peachey, N.M.; Snow, R.C.; Dye, R.C. Multilayer metal membranes for hydrogen separation. Int. J. Hydrogen Energy 1998, 23 (2), 99.

Tosti, S.; Bettinali, L.; Violante, V. Rolled thin Pd and Pd-Ag membranes for hydrogen separation and production. Int. J. Hydrogen Energy 2000, 25 (4), 319.

Tosti, S.; Bettinali, L.; Castelli, S.; Sarto, F.; Scaglione, S.; Violante, V. Sputtered, electroless, and rolled palladium-ceramic membranes. J. Membr. Sci. 2002, 196, 241.

Nishimura, C.; Komaki, M.; Hwang, S.; Amano, M. V—Ni alloy membranes for hydrogen purification. J. Alloys Compd. 2002, 330-332, 902.

* cited by examiner

TUBULAR HYDROGEN PERMEABLE METAL FOIL MEMBRANE AND METHOD OF FABRICATION

STATEMENT REGARDING FEDERALLY SPONSORED RESEARCH OR DEVELOPMENT

This invention was made with Government support under Contract Number W-7405 ENG-36, awarded by the United States Department of Energy to the Regents of the University of California. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

This invention pertains generally to a tubular hydrogen permeable metal foil membrane suitable for hydrogen purification procedures and a method of fabrication. More particularly, the subject invention concerns fabrication process of a thin catalytic-layer coated metal foil membrane formed into a tube and utilized for the purpose of hydrogen purification at elevated temperatures such as those found in membrane reactors.

DESCRIPTION OF RELATED ART

The production of highly purified hydrogen gas is a desired goal for many obvious reasons. The chemical and petrochemical industries handle vast quantities of hydrogen for use in reactions. Purification of this hydrogen is often required. The semiconductor manufacturing industry uses large amounts of hydrogen for depositing materials by chemical vapor deposition processes. The automotive industry is researching ways of reforming fuel on board vehicles, particularly in membrane reactors, to generate hydrogen for electricity production in fuel cells to power electric motors. The hydrogen must be pure so that the fuel cell is not poisoned. Specifically, efficient utilization of coal for chemical and electricity production may be accomplished with the aid of membrane reactors to produce pure hydrogen (see www.netl.doe.gov in relation to DOE Vision 21 Processes). The membrane reactor carries out the water-gas shift reaction to produce purified hydrogen from gasified coal. The hydrogen gas generated from reacting carbon monoxide and water to produce carbon dioxide and hydrogen is removed from the reaction by means of a hydrogen permeable membrane which when results in shifting the equilibrium towards the carbon dioxide and hydrogen products, thereby yielding high conversion values. The membrane-extracted pure hydrogen produces electricity via a fuel cell or chemicals in another suitable reactor and the effluent from the membrane reactor can be further combusted to produce electricity or heat. This water-gas shift scheme has the further advantage of producing a high pressure $CO_2$-rich stream that may more easily be sequestrated. Commercialization of membrane reactor technology will require durable, cost effective, and highly hydrogen permeable membrane materials. The subject invention is a hydrogen permeable metal foil membrane, and method of fabrication, ideally suited for use in a water-gas shift reactor and in processes that require purified hydrogen gas.

Coating a suitable support material (Group IVB and VB elements and alloys of those elements) with catalytically active Pd or Pt or Pd alloy or Pt alloy film is necessary to minimize the use of costly Pd and Pt in a membrane. Pd and Pt alloy films are necessary to reduce the hydrogen embrittlement experienced by pure Pd and Pt films. Some research has indicated that Pd—Cu alloys (particularly 40 weight %) are sulfur tolerant, have increased hydrogen permeability compared to pure Pd, and also resist hydrogen embrittlement. Group V-B metals have been considered since the 1960s as alternatives to Pd alloys for hydrogen separation membranes. These metals are still attractive due to the intrinsically lower cost compared to Pd or Pt and high hydrogen permeability. A Pd or Pt coating is necessary on Group V-B metals foils to protect them from oxidation and impurities found in hydrogen streams as well as to facilitate hydrogen entry and exit from the metal. The foils serve as solid supports for Pd or Pt enabling very thin coatings (<1 μm) of the Pd or Pt and their alloys.

Metal membranes that are selectively permeable to hydrogen are disclosed in various patents and publications (see Tables 1 and 2, immediately below). The purpose of the invention is to create a hydrogen separating membrane that has an advantageous configuration for integrating into processes such as hydrogen separations, and membrane reactors.

A variety of materials have been developed, including Group IV-B and V-B alloys for the primary foil (support layer) and Pd, Pt, Pd alloys, and Pt alloys for the thin catalytic coating. Methods for depositing the catalytic coating include ion-milling the surfaces of the refractory metal foil (the primary foil or support layer) to remove contaminants and oxide layers followed by deposition of the Pd, Pt, Pd alloys, and Pt alloys onto both sides of the foil without breaking the vacuum. This type of sandwich (e.g. palladium/refractory/palladium) membrane is primarily used in the form of a flat sheet. A gas-tight seal is made to a flat sheet of membrane material: through the use of gaskets and compression fittings; diffusion bonding, brazing or welding to a frame or mesh; welding/brazing across the end of a tube. Baake et al. (see Table 1 below) have produced tubular membranes by coating Group IV-B and V-B metal sheets with palladium alloys and then reworking these into tubes. Buxbaum et al. (see Table 1 below) have coated Group IV-B and V-B metal tubes with palladium using electroless and electrolytic deposition.

TABLE 1

| Prior Art Patent References | | | | |
|---|---|---|---|---|
| Patent | Issued | Inventors | Title | Relevance to Subject Invention |
| U.S. Pat. No. 2958391 | Nov. 1, 1960 | De Rosset | Purification of hydrogen | Palladium film supported by porous metal. |

TABLE 1-continued

Prior Art Patent References

| Patent | Issued | Inventors | Title | Relevance to Subject Invention |
|---|---|---|---|---|
| | | | utilizing hydrogen-permeable membranes | |
| U.S. Pat. No. 3350845 | Nov. 7, 1967 | McKinley | Metal alloy for hydrogen separation and purification | Palladium-copper alloy hydrogen separating membrane material. |
| U.S. Pat. No. 3350846 | Nov. 7, 1967 | Makrides et al. | Separation of hydrogen by permeation | Use of Group VA foils coated with palladium and palladium alloys. Attachment of foil to end of stainless steel tube with electron beam welding. |
| U.S. Pat. No. 3393098 | Jul. 16, 1968 | Hartner et al. | Fuel cell comprising a hydrogen diffusion anode having two layers of dissimilar metals and method of operating same | Group VB metals as hydrogen membranes. |
| U.S. Pat. No. 3957534 | May 18, 1976 | Linkohr et al. | Diaphragm for the separation of hydrogen from hydrogen-containing gaseous mixtures | A TiNi alloy for hydrogen separation. |
| U.S. Pat. No. 4468235 | Aug. 28, 1984 | Hill | Hydrogen separation using coated titanium alloys | Titanium alloy membrane coated with palladium alloy. |
| U.S. Pat. No. 4496373 | Jan. 29, 1985 | Behr et al. | Diffusion membrane and process for separating hydrogen from gas mixture | Palladium alloy coated Group IV-B and V-B alloys. |
| U.S. Pat. No. 5139541 | Feb. 12, 1992 | Edlund | Hydrogen-permeable composite metal membrane | Group I-B, III-B, IV-B, V-B and VII-B metal and metal alloy foils coated with palladium alloys. |
| U.S. Pat. No. 5149420 | Sep. 22, 1992 | Buxbaum et al. | Method for plating palladium | Deposition of a palladium layer onto a Group IV-B or V-B metals and their alloys using electroless and electrolytic plating. |
| U.S. Pat. No. 5215729 | Jun. 1, 1993 | Buxbaum | Composite metal membrane for hydrogen extraction | Deposition of a palladium layer onto a Group IV-B or V-B metals and their alloys using electroless and electrolytic plating. |
| U.S. Pat. No. 5217506 | Jun. 8, 1993 | Edlund | Hydrogen-permeable composite membrane and uses thereof | Group I-B, III-B, IV-B, V-B and VII-B metal and metal alloy foils coated with palladium alloys. |
| U.S. Pat. No. 5259870 | Nov. 9, 1993 | Edlund | Hydrogen-permeable composite metal membrane | Group I-B, III-B, IV-B, V-B and VII-B metal and metal alloy foils coated with palladium alloys. |
| U.S. Pat. No. 5393325 | Feb. 28, 1995 | Edlund | Composite hydrogen separation metal membrane | Group I-B, III-B, IV-B, V-B and VII-B metal and metal alloy foils coated with palladium alloys. |
| U.S. Pat. No. 5498278 | Mar. 12, 1996 | Edlund | Composite hydrogen separation element and module | Palladium alloy coated refractory metals. |

TABLE 1-continued

| Prior Art Patent References | | | | |
|---|---|---|---|---|
| Patent | Issued | Inventors | Title | Relevance to Subject Invention |
| U.S. Pat. No. 5645626 | Jul. 8, 1997 | Edlund | Composite hydrogen separation element and module | Palladium alloy coated refractory metals. |
| U.S. Pat. No. 5738708 WO9640413 | Apr. 14, 1998 | Peachey et al. | Composite metal membrane | Method of coating palladium alloys onto the Group IV-B and V-B foil. |
| U.S. Pat. No. 5888273 | Mar. 30, 1999 | Buxbaum | High-temperature gas purification system | Group V-B metal alloys coated with palladium alloys. |
| U.S. Pat. No. 5931987 | Mar. 8, 1999 | Buxbaum | Apparatus and methods for gas extraction | Group V-B metal alloys coated with palladium alloys. |
| U.S. Pat. No. 6183543 | Feb. 6, 2001 | Buxbaum | Apparatus and methods for gas extraction | Group V-B metal alloys coated with palladium alloys. |
| U.S. Pat. No. 6214090 | Apr. 10, 2001 | Dye et al. | Thermally tolerant multilayer metal membrane | Method of coating palladium alloys onto the Group IV-B and V-B foil. Metal alloys used as membrane materials. |
| U.S. Pat. No. 6267801 | Jul. 31, 2001 | Baake et al. | Method for producing a tubular hydrogen permeation membrane | Palladium alloy coated Group IV-B and V-B metals, formed into a tube by drawing, pressing or extrusion. |

TABLE 2

| Prior Art Publication References | |
|---|---|
| Publication | Relevance to Subject Invention |
| 1. Holleck, G. L. Hydrogen Diffusion through (Palladium-Silver)-Tantalum-(Palladium-Silver) Composites. J. Phys. Chem. 1970, 74 (9), 1957. | Permeation of hydrogen through palladium-silver coated tantalum. |
| 2. Boes, N.; Züchner, H. Diffusion of Hydrogen and Deuterium in Ta, Nb, and V. phys. stat. sol. (a) 1973, 17, K111. | Permeation of hydrogen through tantalum, niobium and vanadium coated with palladium. |
| 3. Boes, N.; Züchner, H. Application of Electrochemical Techniques for Studying Diffusion of Hydrogen Isotopes in V, Nb and Ta. Zeitschrift für Naturforschung A 1976, 31, 760. | |
| 4. Boes, N.; Züchner, H. Preparation of Hydrogen Permeable Foils of V, Nb and Ta by Means of Ultra High Vacuum Techniques. Zeitschrift für Naturforschung A 1976, 31, 754. | |
| 5. Boes, N.; Züchner, H. Secondary ion mass spectrometry and Auger electron spectroscopy investigations of Vb metal foils prepared for hydrogen permeation measurements. Surf. Tech. 1978, 7, 401. | |
| 6. Züchner, H. Multilayer problems in studying the diffusion of hydrogen in metals by time-lag techniques. Trans. JIM (Trans. JIM) 1980, 21 (supplement), 101. | Permeation of hydrogen through tantalum coated with 100 nm of palladium. |
| 7. Buxbaum, R. E. The Use of Zirconium-Palladium Windows for the Separation of Tritium from the Liquid Metal Breeder-Blanket of a Fusion Reactor. Sep. Sci. Tech. 1983, 18 (12 & 13), 1251. | Palladium coated zirconium. |
| 8. Hsu, C.; Buxbaum, R. E. Palladium-catalyzed oxidative diffusion for tritium extraction from breeder-blanket fluids at low concentrations. J. Nucl. Mater. 1986, 141–143, 238. | Palladium coated zirconium, niobium, or vanadium. |
| 9. Weirich, W.; Biallas, B.; Kügler, B.; Oertel, M.; Pietsch, M.; Winkelmann, U. Development of a laboratory cycle for a thermochemical water-splitting process (Me/MeH cycle). Int. J. Hydrogen Energy 1986, 11 (7), 459. | Titanium-nickel foil membranes coated with palladium-copper. |

TABLE 2-continued

Prior Art Publication References

| Publication | Relevance to Subject Invention |
|---|---|
| 10. Nishimura, C.; Komaki, M.; Amano, M. Hydrogen Permeation Characteristics of Vanadium-Nickel Alloys. Mater. Trans., JIM 1991, 32 (5), 501. | Vanadium-nickel alloys coated with palladium. |
| 11. Amano, M.; Komaki. M.; Nishimura, C. Hydrogen permeation characteristic of palladium-plated V—Ni alloy membranes. J. Less-Common Met. 1991, 172–174, 727. | Vanadium-nickel alloys coated with palladium. |
| 12. Katsuta, H.; McLellan, R. B.; Furukawa, K. Metal hydrides in energy conversion systems. Trans. JIM (Trans. JIM) 1980, 21 (supplement), 113. | Permeability of palladium coated vanadium. |
| 13. Buxbaum, R. E.; Hsu, P. C. Measurement of diffusive and surface transport resistances for deuterium in palladium-coated zirconium membranes. J. Nucl. Mater. 1992, 189 (1), 183. | Palladium coated zirconium. |
| 14. Buxbaum, R. E.; Marker, T. L. Hydrogen transport through non-porous membranes of palladium-coated niobium, tantalum and vanadium. J. Membr. Sci. 1993, 85, 29. | Palladium coated niobium, tantalum, and vanadium tubes. |
| 15. Edlund, D. J.; McCarthy, J. The relationship between intermetallic diffusion and flux decline in composite-metal membranes: implications for achieving long membrane lifetime. J. Membr. Sci. 1995, 107, 147. | Vanadium coated with palladium. |
| 16. Buxbaum, R. E.; Kinney, A. B. Hydrogen Transport through Tubular Membranes of Palladium-Coated Tantalum and Niobium. Ind. Eng. Chem. Res. 1996, 35, 530. | Palladium coated niobium and tantalum tubes. |
| 17. Buxbaum, R. E.; Subramanian, R.; Park, J. H.; Smith, D. L. Hydrogen transport and embrittlement for palladium coated vanadium-chromium-titanium alloys. J. Nucl. Mater. 1996, 233–237, 510. | V—Cr—Ti alloy tubes coated with palladium. |
| 18. Romanenko, O. G.; Tazhibaeva, I. L.; Shestakov, V. P.; Klepikov, A. K.; Chikhray, Y. V.; Golossanov, A. V.; Kolbasov, B. N. Hydrogen gas driven permeation through vanadium alloy VCr6Ti5. J. Nucl. Mater. 1996, 233–237, 376. | Hydrogen permeability of a VCr6Ti5 alloy. |
| 19. Peachey, N. M.; Dye, R. C. High temperature efforts at Los Alamos National Laboratory, DE96011306; Los Alamos National Laboratory: Los Alamos, New Mexico, US, 1995. | Tantalum coated with palladium on both sides after ion-milling. |
| 20. Peachey, N. M.; Snow, R. C.; Dye, R. C. Composite Pd/Ta metal membranes for hydrogen separation. J. Membr. Sci. 1996, 111, 123. | |
| 21. Moss, T. S.; Dye, R. C. Engineering materials for hydrogen separation, DE97002456; Los Alamos National Laboratory: Los Alamos, New Mexico, US, 1996. | Group V-B metal foil coated on both sides with palladium after ion-milling. |
| 22. Moss, T. S.; Dye, R. C. Composite Metal Membranes for Hydrogen Separation Applications, DE97007586; Los Alamos National Laboratory: Los Alamos, New Mexico, US, 1997 | |
| 23. Dye, R. C.; Birdsell, S. A.; Snow, R. C.; Moss, T. S.; Peachey, N. Advancing the Technology Base for High-Temperature Membranes, DE98000093; Los Alamos National Laboratory: Los Alamos, New Mexico, US, 1997. | |
| 24. Moss, T. S.; Peachey, N. M.; Snow, R. C.; Dye, R. C. Multilayer metal membranes for hydrogen separation. Int. J. Hydrogen Energy 1998, 23 (2), 99. | |
| 25. Tosti, S.; Bettinali, L.; Violante, V. Rolled thin Pd and Pd—Ag membranes for hydrogen separation and production. Int. J. Hydrogen Energy 2000, 25 (4), 319. | TIG welded a palladium-silver alloy foil into the shape of a tube. The fixture clamps the foil together at the weld seam and the foil is wrapped around a brass mandrel. The 50 μm palladium-silver tube is brazed to a stainless steel tube. |
| 26. Tosti, S.; Bettinali, L.; Castelli, S.; Sarto, F.; Scaglione, S.; Violante, V. Sputtered, electroless, and rolled palladium-ceramic membranes. J. Membr. Sci. 2002, 196, 241. | 50–70 μm thick palladium-silver foils TIG arc-welded or diffusion welded into the shape of a tube around tubular porous ceramic supports. |

TABLE 2-continued

| Prior Art Publication References | |
|---|---|
| Publication | Relevance to Subject Invention |
| 27. Nishimura, C.; Komaki, M.; Hwang, S.; Amano, M. V—Ni alloy membranes for hydrogen purification. J. Alloys Compd. 2002, 330–332, 902. | Vanadium-nickel alloy coated with palladium. |

The foregoing patents and other publications reflect the state of the art of which the applicant is aware and are tendered with the view toward discharging applicant's acknowledged duty of candor in disclosing information which may be pertinent in the examination of this application. It is respectfully submitted, however, that none of these patents teaches or renders obvious, singly or when considered in combination, applicant's claimed invention.

BRIEF SUMMARY OF THE INVENTION

An object of the invention is to provide a method of fabricating a hydrogen permeable metal membrane.

Another object of the invention is a method of fabricating a hydrogen permeable metal membrane from virtually any suitable metal membrane material, whereby the produced membrane is essentially leak-free.

A still further object of the invention is to relate a fabrication fixture employed in producing leak-free metal membranes in which an expandable inner rod is utilized in conjunction with a mated outer housing.

Further objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 5:
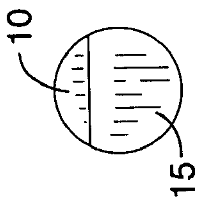
FIG. 5 is a first end view drawing of the subject metal expansion rods shown in their "expanded" position (where the ends are approximately aligned).

Referring more specifically to the drawings, for illustrative purposes the present invention is embodied in the apparatus generally shown in FIG. 1 through FIG. 18. It will be appreciated that the apparatus may vary as to configuration and as to details of the parts, and that the method may vary as to the specific steps and sequence, without departing from the basic concepts as disclosed herein.

Generally, the subject V-alloy composite membranes comprise a V-Cu foil with a Pd coating. Fabrication of the subject V-alloy composite membranes consisted of the following generalized steps [Peachey, N. M.; Snow, R. C.; Dye, R. C. Composite Pd/Ta metal membranes for hydrogen separation. J. Membr. Sci. 1996, 111, 123, U.S. Pat. No. 5,738,708, and Moss, T. S.; Peachey, N. M.; Snow, R. C.; Dye, R. C. Multilayer metal membranes for hydrogen separation. Int. J. Hydrogen Energy 1998, 23 (2), 99, which are herein incorporated by reference]; 1) melting and rolling alloy foils, 2) cleaning, deposition of Pd, and 3) welding into a tubular shape. High purity (99.9%) powders were mixed and electron beam (e-beam) melted into buttons in a vacuum furnace. The buttons were flipped and re-melted several times to ensure compositional uniformity. The alloys were cold rolled into ~5×15 cm strips with a nominal thickness of 40 μm. The foils were washed with soap and water, rinsed with methanol, blown dry with nitrogen, mounted by clamping the ends of the foil strip, and loaded into the physical vapor deposition (PVD) chamber. After evacuation, argon was bled into the chamber to a pressure of 1.510–4 Torr and the ion-gun (ion Tech, Teddington, UK) was set to a power of 1 keV and 20–25 mA to ion-mill each side of the foil for 60–90 min. The foil was visually inspected through a window during ion-milling to ensure removal of all remaining macroscopic contaminants. After ion-milling, the chamber was evacuated to 110–7 Torr and the e-beam (Airco-Temescal CV-14 power supply) evaporated Pd onto the foil at 3–5 A/s. A piezoelectric device was used to determine the thickness of metal deposited. Approximately 100 nm of Pd or Pd alloy was deposited onto each side of the foil. A tubular membrane was fabricated by placing the foil in a specially designed fixture and electron beam welding the foil to itself and to stainless steel fittings. The membrane was plumbed into the test system for evaluation. Permeation tests for membranes were conducted by heating at 1° C./min under argon purge (all gases were 99.999% pure) to the desired temperature followed by introduction of pure hydrogen and measurement of the permeation flux at pressure differences across the membrane up to 100 psig. The test bench was described previously [Paglieri, S. N. and S. A. Birdsell. Palladium alloy composite membranes for hydrogen separation. in 15th Annual Conf. Fossil Energy Mater. 2001. Knoxville, Tenn.: Oak Ridge Natl. Lab., which is herein incorporated by reference].

Several tubular V—Cu alloy membranes were fabricated and tested. The foil was determined to contain 2 atom % Cu by AES. This is close to the solubility limit of Cu in V [12]. The first membrane was not coated with Pd and permeated less than 1 sccm of hydrogen at 300° C. and a $\Delta P$ across the membrane of 100 psi. Argon did not measurably permeate through the membrane. The membrane survived a cool down to room temperature until it was re-pressurized with argon at ~100 psig.

The subject invention is a hydrogen separating membrane that has an advantageous configuration for integrating into processes such as hydrogen separations, and membrane reactors. Further, the subject invention is concerned with the formation of a leak free metal membrane and its attachment to connective plumbing for the purpose of hydrogen purification at elevated temperatures. A difficulty that is often encountered in the development of hydrogen separating metal membranes is the formation of the material into a configuration suitable for long-term operation at high temperatures and pressures. Tubes are a favorable geometry for membranes due to strength, high surface-to-volume ratio, and fewer mass transfer limitations. Tubes are also easier to manifold and manufacture into process equipment and if one tube breaks it can be isolated or replaced.

For the subject invention, a thin metal foil is welded into a tube to form a hydrogen separating membrane. The foil material is from Groups IV-B and V-B of the Periodic Table such as, but not limited to; vanadium, niobium, tantalum, titanium, or zirconium or alloys comprised of the aforementioned metals combined with each other or containing copper, nickel or silver.

In forming the tubular membrane, a specific fixture clamps the seam together during the process of welding the foil and contains a halved copper rod that acts as both a heat sink and a means by which the foil is mounted in the fixture during welding. Once the foil is welded into a tubular shape, it is welded or brazed (usually using silver or other suitable material) to other metals to form a leak-free seal.

Foils of Group IV-B and V-B metals or their alloys are placed in a vacuum chamber, ion-milled using an ion gun and an inert gas such as argon and then coated with palladium and palladium alloys. Usually, electron beam (e-beam) evaporation is used for the deposition of palladium, although other physical vapor deposition processes may also be used. Other methods such as chemical vapor deposition (CVD), electrodeposition, or electroless plating may also be employed for deposition of the palladium coating. The foils are ideally between 5 and 100 μm thick while the thickness of the palladium or palladium alloy layer is preferably about 1,000 Å thick. Therefore, the Group IVB or VB metal foil serves as a support for the thin but continuous palladium or palladium alloy film.

Group IV-B or V-B metals have intrinsically high hydrogen solubilities and permeabilities although they are readily oxidized and the surface is passivated because of their reactivity. A protective coating of a metal that is catalytically active for the dissociation of hydrogen into atoms is required on both sides of the foil in order to inhibit contamination and facilitate the entry and exit of hydrogen through the foil. Due to high hydrogen solubility, Group IV-B or V-B metals are subject to hydrogen embrittlement during operation as a membrane and particularly during thermal cycling. In order to decrease the solubility of hydrogen in these metals (and therefore lessen the problem of embrittlement) these metals are alloyed with each other or with Group I-A metals such as copper, nickel, or silver. Likewise, pure palladium also embrittles and alloying it with other metals such as silver, copper, yttrium, ruthenium, or gold is required to prevent hydrogen embrittlement of the palladium coating.

As mentioned above, a fixture is required in order to weld the foil into the shape of a tube. The fixture clamps the two edges of the foil together during welding so that a continuous and gas-tight seam may be formed. A rod made of a material with high heat conductivity such as copper, brass, or graphite is sliced diagonally to slide and wedge the foil into a cylindrical shape and press the seam together during welding. The halved rod also serves the function of a heat sink, to absorb energy during welding. Otherwise, the thin foil will melt, and pinholes will be formed. The foil, welded to itself into the shape of a tube, is removed from the fixture and slipped over the end of a plumbing tube, made of stainless steel, for example. The foil may be welded directly to the tube or an interlayer of silver may be deposited onto the stainless steel tube and the foil brazed to the coated tube. The silver layer should be between about 10 and 20 μm thick. Electron beam welding is used during all of these steps to maintain precise control over beam power and avoid creating holes in the thin foil. E-beam welding is also performed under vacuum, eliminating the likelihood that the refractory metal foil will oxidize during welding. TIG (Tungsten Inert Gas) welding may also be employed to weld the foil to itself and to the plumbing tubes.

Some uses of the tubular membrane include ultra high hydrogen purification to parts per billion (ppb) levels of impurities, and use as a membrane reactor for gaseous or liquid hydrogenations and dehydrogenations. When used as a membrane reactor the membrane removes hydrogen from the reaction space and increases the reaction yield. The surface of the membrane itself can be catalytic towards the desired reaction or catalyst can be packed around it.

Figure 6:
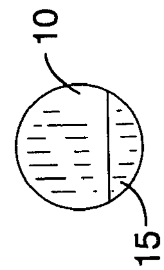
FIG. 6 is a second end view drawing of the subject metal expansion rods shown in their "expanded" position (where the ends are approximately aligned).
Figure 1:
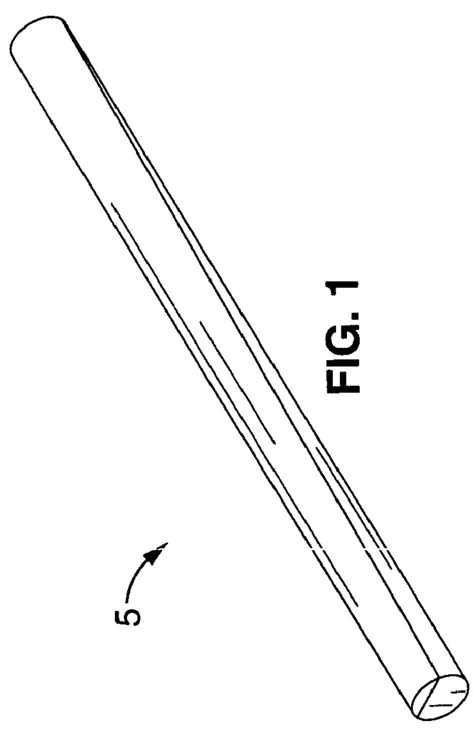
FIG. 1 is a perspective drawing of the subject metal expansion rods shown in their "expanded" position (where the ends are approximately aligned).
Figure 2:
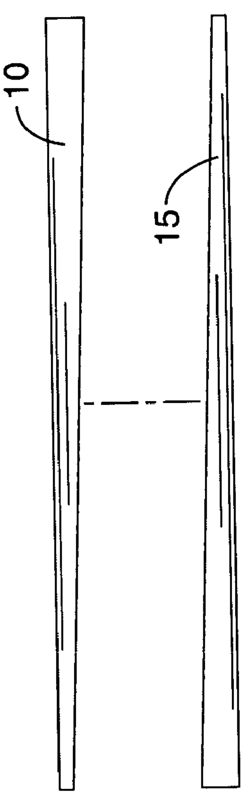
FIG. 2 is a side view of the subject metal expansion rods shown in their "expanded" but vertically separated, for clarity, position (where the ends are approximately aligned).
Figure 3:
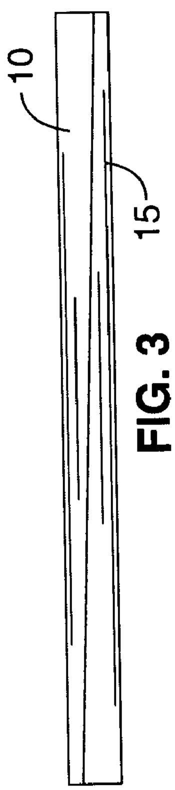
FIG. 3 is a side view drawing of the subject metal expansion rods shown in their "expanded" position (where the ends are approximately aligned).
Figure 4:
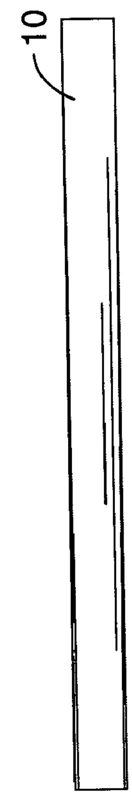
FIG. 4 is a top view drawing of the subject metal expansion rods shown in their "expanded" position (where the ends are approximately aligned).
Figure 7:
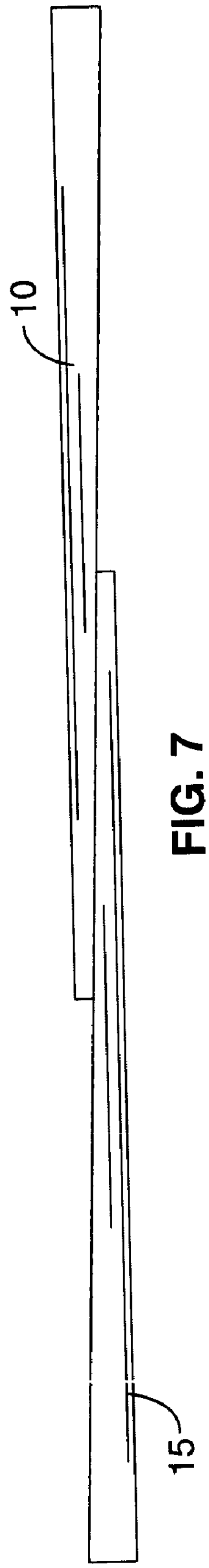
FIG. 7 is a side view drawing of the subject metal expansion rods shown in their "non-expanded" position.
Figure 8:
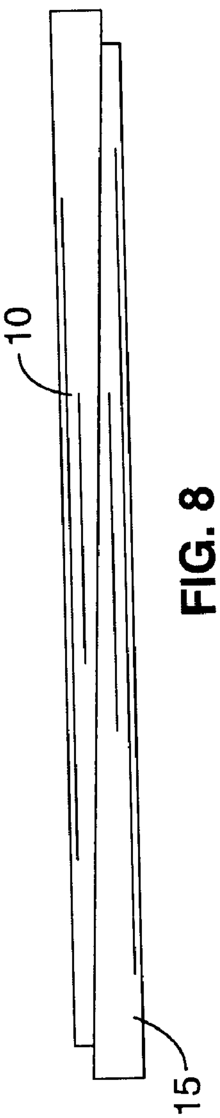
FIG. 8 is a side view drawing of the subject metal expansion rods shown in their "intermediate-expanded" position (the opposing ends of each half-rod have been pushed inward).
Figure 9:
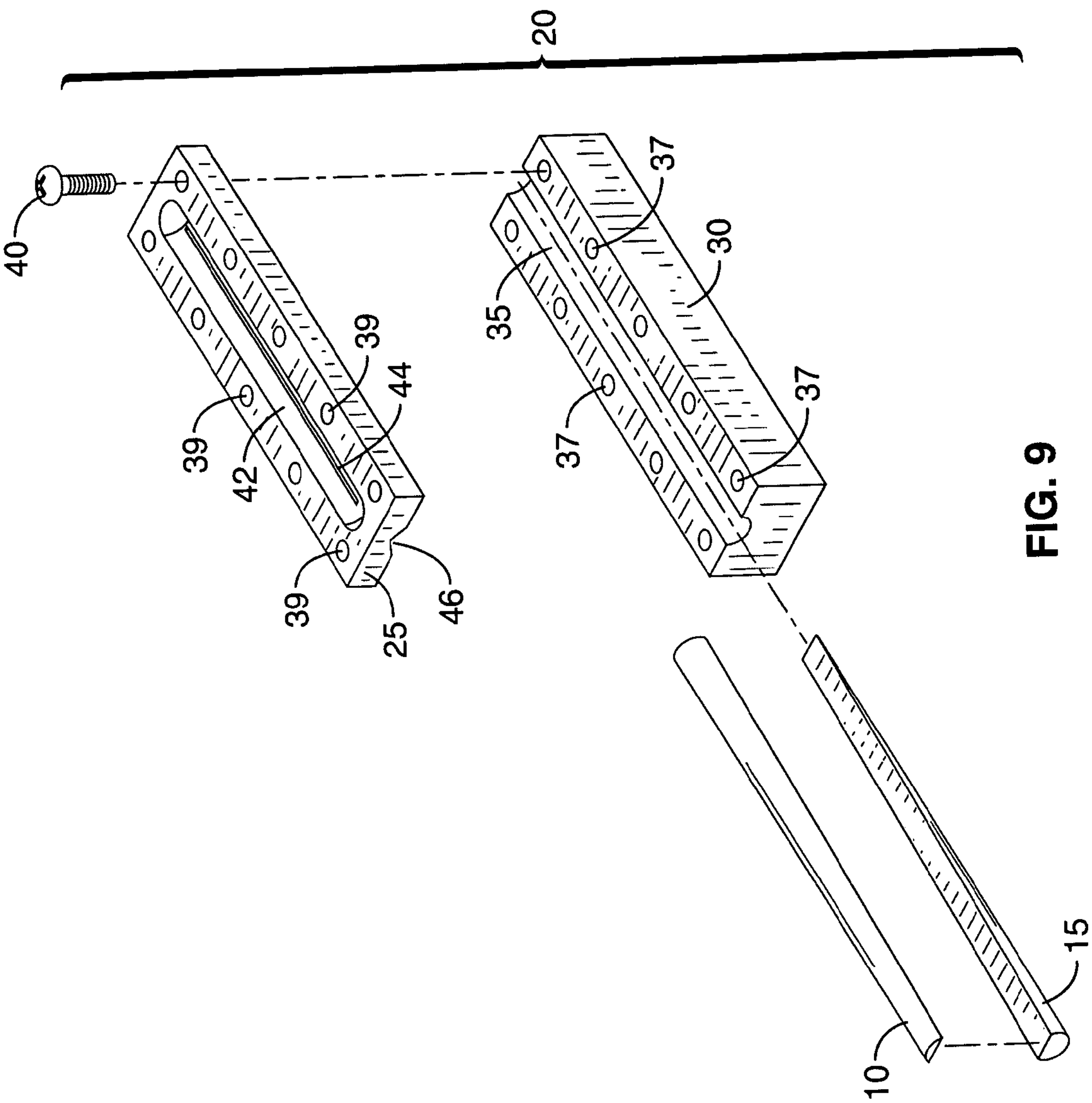
FIG. 9 is an exploded view of the subject apparatus.
Figure 12:
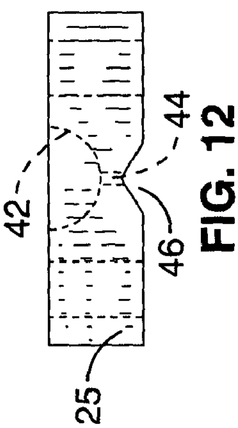
FIG. 12 is an end view of the top half of the subject surrounding fixture housing.
Figure 14:
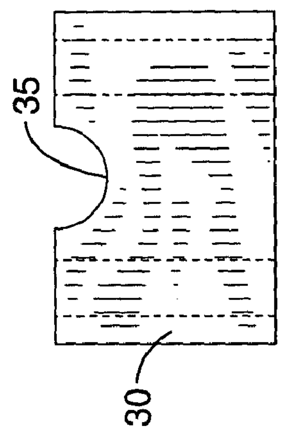
FIG. 14 is an end view of the bottom half of the subject surrounding fixture housing.
Figure 10:
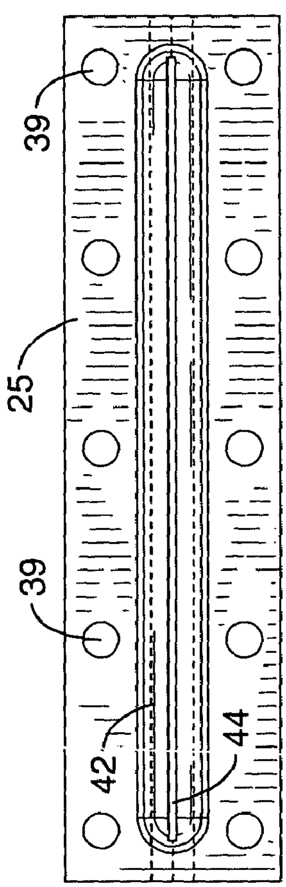
FIG. 10 is a top view of the top half of the subject surrounding fixture housing.
Figure 11:
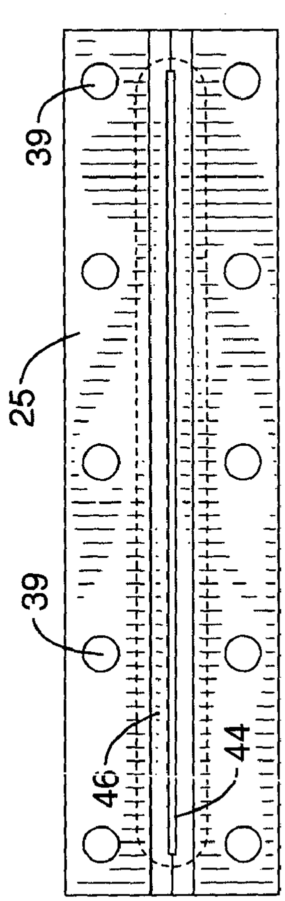
FIG. 11 is a bottom view of the top half of the subject surrounding fixture housing.
Figure 13:
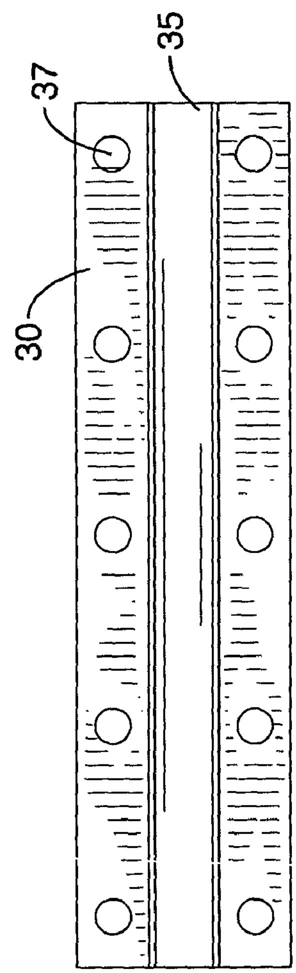
FIG. 13 is top view of the bottom half of the subject surrounding fixture housing.

Detailed Description of the Subject Fabrication Fixture Utilized in the Subject Tubular Foil Membrane Fabrication Procedure Metal Expansion Rod: As seen in FIGS. 1–8, the two-part metal expansion rod 5, around which the alloy foil is formed and made taut comprises two halves 10 and 15. Although a copper rod is generally used, other equivalent heat-sink suitable and structurally supportive metals and alloys are acceptable. Thus, by way of example and not by way of limitation, a 0.635 cm (0.25 inch) diameter copper rod was sliced in half diagonally using wire EDM (electrical discharge machining) or other suitable separation means. FIG. 1 shows a diagonal cut along a solid rod's long axis generated the two halves 10 and 15 . FIG. 2 illustrates that the two halves 10 and 15 are freely separable from one another, with an aligned side view seen in FIG. 3 and an aligned top or bottom view seen in FIG. 4. Opposing end views are depicted in FIGS. 5 and 6. When the membrane foil is wrapped around both halves of the copper rod 10 and 15 the foil is loosely formed into the shape of a cylinder. Once mounted and secured in the surrounding fixture housing 20 (see immediately below), by pushing together on the two halves 10 and 15 of the copper rod 5 (see FIGS. 7 and 8 in which FIG. 7 shows an earlier position in the expansion process and FIG. 8 shows a later position in the expansion process in which the outer diameter of the rod 5 is enlarged over earlier positions), the foil is tightened against the fixture housing , eventually enabling a hermetic seam to be welded.

Surrounding Fixture Housing: The fixture housing 20 comprises two mating sections 25 and 30. Although various types of materials may be utilized to form the two sections 25 and 30, an acceptable material is aluminum. The bottom section 30 of the fixture was machined from a rectangular block of aluminum and consisted of a trough 35 formed in the bottom section 30 of the fixture (a trough of 0.3175 cm (0.125 inch) radius has been shown to function, as would other equivalent radii). Apertures 37 were tapped into the edges of the bottom section 30 of the fixture to anchor the top section 25 of the fixture with suitable/standard attachment means. The top section 25 of the fixture was machined from a rectangular aluminum block with apertures 39 around the edges to receive anchoring means such as screws 40 that anchor into the corresponding apertures 37 in the bottom section of the fixture 30. An upper trough 42 is formed in the upper surface of the upper section 25 of the fixture. A slit 44 is placed in the upper fixture section 25, within the upper trough 42. Often the (0.028 inch is acceptable) slit 44 is machined into and through a length of the top fixture section 25, although other methods of introducing the slit are acceptable. The slit 44 is where an electron beam, or other equivalent welding means, will eventually weld the foil to itself to form a leak-free seam. A groove 46 is formed in the lower surface of the upper section of the fixture 25. This groove 46 may be of many standard shapes, often "V-shaped," as seen in the subject figures.

Figure 15:
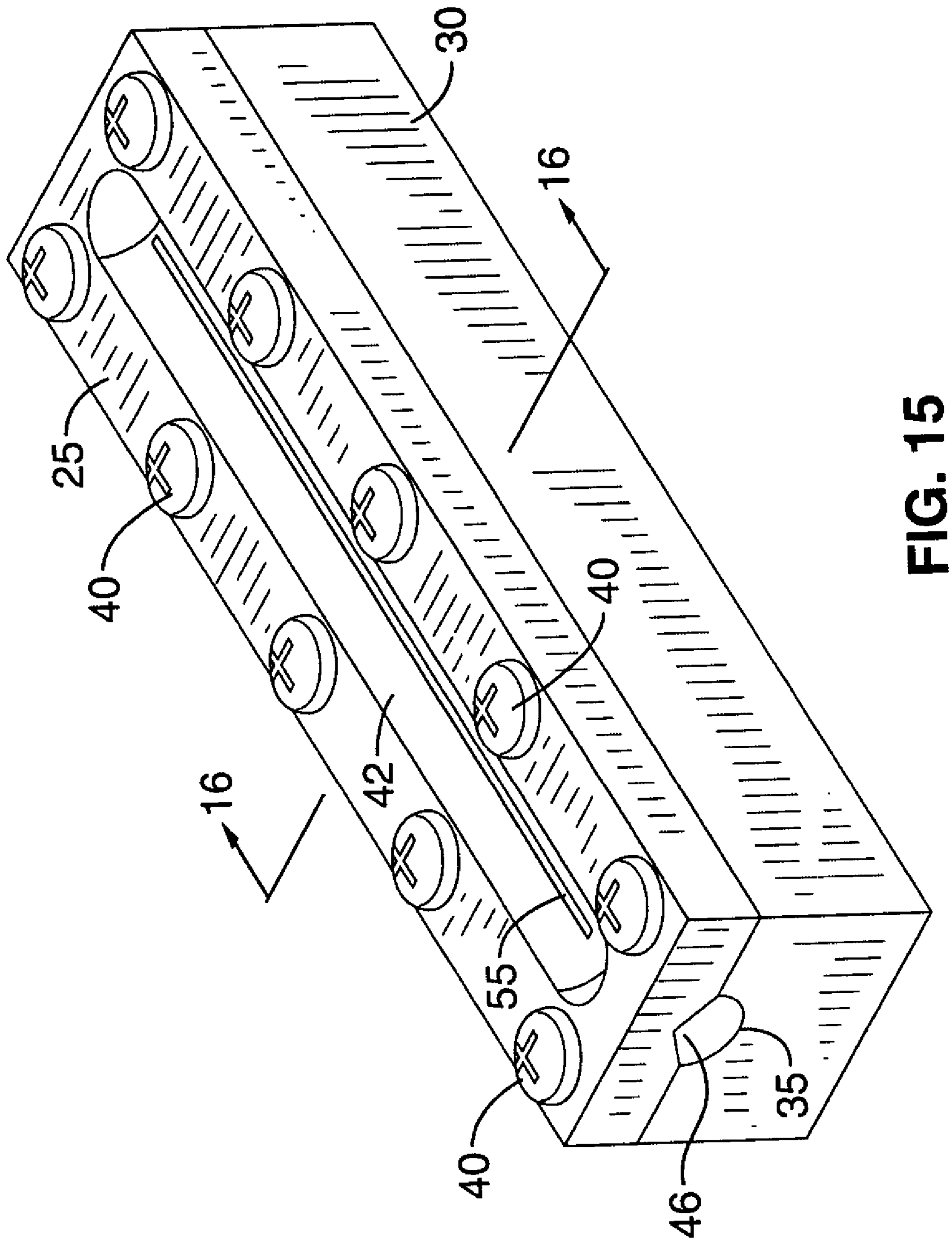
FIG. 15 is a perspective view of the subject fixture.
Figure 16:
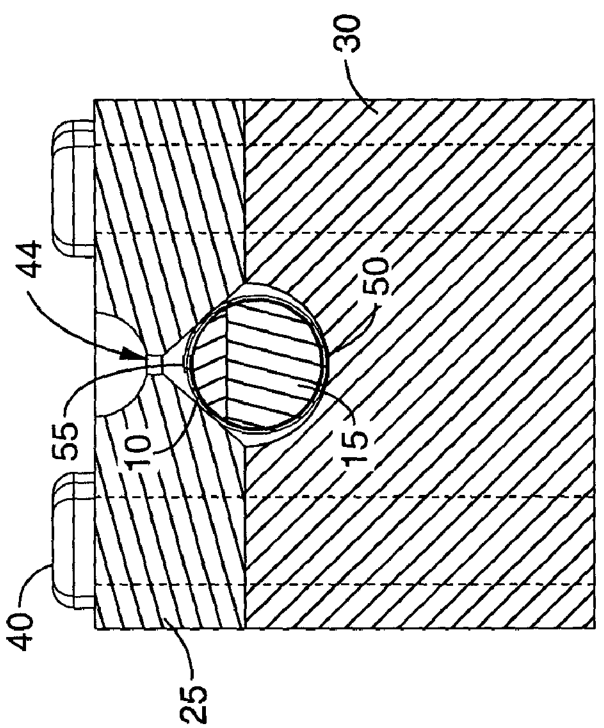
FIG. 16 is a cross-sectional view of the subject fixture showing the foil surrounding the metal expansion rods with the foil edges overlapping beneath the slit in the top half of the surrounding fixture housing and taken along line 16—16 in FIG. 15.

Assembled Fixture Housing and Metal Expansion Rod: FIGS. 15 and 16 show the assembled apparatus, both parts of the fixture housing 25 and 30 and both parts of the metal expansion rod 10 and 15 in their expanded positions. Included is a metal foil 50 wrapped around the expanded rod halves 10 and 15, with its eventual seam edges 55 overlapping and showing through the slit 44.

Detailed Description of Subject Tubular Foil Membrane Fabrication Procedure

1. The alloy foil 50 is cleaned, dried, placed in the vacuum coating chamber, ion-milled on both sides, and without breaking vacuum, coated on both sides with a layer of palladium (usually the thickness is between 100–10,000 Å, although 1000 Å is typically used) (see U.S. Pat. No. 5,738,708 by Peachey et al. and the publication by Moss et al. in International J. of Hydrogen Energy, 23 (2), (1998)).

2. The foil 50 is cut to the proper dimensions and rolled around the metal expansion rod 5 halves 10 and 15. The foil 50 when formed into a tube should overlap itself so that it can be welded to itself along its future seam edges 55, through slit 44, to produce a welded seam 65.

3. The wrapped metal expansion rod 5 is placed in the two-piece fixture housing 20 and the two halves 25 and 30 screwed together to secure the foil overlapping region 55 so as to be welding accessible through slit 44 formed in the top half of the fixture 25. The two halves 10 and 15 of the metal expansion rod 5 are then pushed together to tighten the overlapping foil 50 together along and beneath the slit 44 so that during welding a continuous seam 65 is formed.

4. The assembled fixture (housing halves 25 and 30 and metal expansion rods halves 10 and 15) with the foil 50 securely tightened about the rod 5 and inside the housing fixture 20, with the future seam 65 (the overlapping foil edges region 55) exposed, is placed in a suitable welding device, often an electron welder, and the associated vacuum chamber is then evacuated. For an electron welder apparatus, the electron beam at relatively low power is slowly guided along overlapping foil edges region 55 to weld a seam. Visual inspection during the process helps to prevent the formation of holes in the thin foil 50 due to excessive heat buildup and conversely ensures enough power is supplied to form a continuous weld along the overlapping foil edges region 55. It is stressed that any suitable seam-forming device is contemplated, for example TIG or a laser welder with an inert gas blanket would also work to weld the foil using the subject fixture.

5. The assembled fixture (housing halves 25 and 30 and metal expansion rod halves 10 and 15 ) with the welded overlapping foil edges region 55 now forming a seam 65, is removed from the vacuum chamber and the foil (welded to itself into the shape of a tube or cylinder) is removed from the subject fixture. The produced metal membrane tube is then fitted with suitable "plumbing" adaptors to be utilized in any desired application. For example, the ends of the foil tube are slipped over tubing or VOR gland fittings. The fit should be snug enough to facilitate the formation of a continuous weld. The foil tube with its fittings/tubes is loaded into an electron beam welder vacuum chamber (or equivalent), evacuated, and welded while rotating the tube. For example, while vanadium alloy is easily welded to a stainless steel fitting/tube, a silver braze coating on the fitting/tube can be used to braze the foil to the fitting/tube and may help in adhesion of the vanadium alloy foil during hydrogen permeation testing. The silver-brazed fittings are prepared by milling down the OD of the tube, cleaning, and coating with silver to a thickness of ~15 μm using PVD (although other deposition methods may be used).

EXPERIMENTAL EXAMPLES

Example 1

Non-Catalytic Coated Reference Structure

Vanadium and copper were electron-beam melted on a water-cooled copper hearth. The produced button was flipped and re-melted several times to ensure compositional uniformity of 25 weight % copper. The resulting button was cold rolled into an ~5×15 cm (~2×5.9 inch) strip with a nominal thickness of 40 μm (~1.6 mil). The foil was washed with soap and water, rinsed with methanol, and blown dry with nitrogen.

A piece of the foil was placed into a subject fixture and welded to itself to form a tube. The bottom half of the fixture was machined from a rectangular block of aluminum and consisted of a 0.3175 cm (0.125 inch) radius trough bored along a block. The foil was wrapped around the both halves of the copper expansion rod (0.635 cm (0.25 inch) diameter copper rod) into the shape of a cylinder and placed in the trough. The top of the fixture was a rectangular aluminum block. A (0.028 inch) slit was machined along the length of the top fixture where the electron beam welded the foil to itself to form a leak-free seam. The electron-beam welder was at a power of 0.55 A when the foil was welded to itself to form a 0.635 cm (0.25 inch) cylinder.

The tubing ends of stainless steel 0.635 cm (0.25 inch) VCR glands were machined down, PVD coated with 15 microns (0.59 mil) of silver, and placed inside the ends of the cylindrical foil tube. The glands fit tightly so that no fixture was needed during welding. The ends of the foil cylinder were brazed to the VCR glands using electron-beam welding at a power of 0.62 A. The resulting membrane module was cleaned with acetone and ethanol, attached to VCR fittings attached to a gas manifold, and the membrane tube lumen was pressurized with argon to 44 psia with no detectable leakage. The membrane was heated to 300° C. at 1° C./minute. Hydrogen permeation through the membrane was <1 sccm (cm$^3$ (STP)/minute) at 40 psia. The membrane was exposed to hydrogen flowing at 200 sccm for 24 hours and then cooled to 25° C.

The membrane was then pressurized with argon to 114 psia and <1 sccm leakage was observed.

Example 2

Catalytic Coated Structure (same as Example 1 Except the Foil is Coated with Palladium to Make the Hydrogen Separating Membrane, the Coated Foil is Welded Directly to the Stainless Steel VCR Gland Fittings Instead of Brazed to Silver Coated Fittings, and the Membrane is Tested for Pinholes and Hydrogen Permeability)

Vanadium and copper were electron-beam melted on a water-cooled copper hearth. The button was flipped and re-melted several times to ensure compositional uniformity of 25 weight % copper. The resulting button was cold rolled into a 5×15 cm (2×5.9 inch) strip with a nominal thickness of 40 μm (1.6 mil). The foil was washed with soap and water, rinsed with methanol, and blown dry with nitrogen. The foil was mounted by clamping the ends of the foil strip, and loaded into the physical vapor deposition (PVD) chamber. After evacuation to $1\cdot10^{-6}$ Torr, argon was bled into the chamber to a pressure of $1.5\cdot10^{-4}$ Torr and the ion-gun (ion Tech, Teddington, UK) was set to a power of 1 keV and 20–25 mA to ion-mill each side of the foil for 60–90 min. The foil was visually inspected through a window during ion-milling to ensure removal of all remaining macroscopic contaminants. Without breaking vacuum, the chamber was evacuated to $1\cdot10^{-6}$ Torr and a 1000 Å (3.9 microinch) layer of palladium was deposited on each side by e-beam evaporation (Airco-Temescal CV-14 power supply) at 3–5 Å/s. A quartz crystal was used to monitor the thickness of metal deposited.

A piece of the foil was placed into a fixture and welded to itself to form a tube. The bottom half of the fixture was machined from a rectangular block of aluminum and consisted of a 0.3175 cm (0.125 inch) radius trough bored along a block. Holes were tapped into the edges of the block to screw down the top of the fixture. The foil was wrapped around both halves of the copper rod into the shape of a cylinder and placed in the trough. The top of the fixture was a rectangular aluminum block with holes around the edges to put screws through to attach to the bottom fixture. A (0.028 inch) slit was machined along the length of the top fixture where the electron beam welded the foil to itself to form a leak-free seam. A 0.635 cm (0.25 inch) diameter copper rod was sliced in half diagonally using wire EDM (electrical discharge machining). By pushing together on the two halves of the copper rod, the foil could be tightened against the fixture, enabling a hermetic seam to be welded. The electron-beam welder was at a power of 0.55 A when the foil was welded to itself to form a 0.635 cm (0.25 inch) cylinder.

The tubing ends of stainless steel 0.635 cm (0.25 inch) VCR glands were machined down and placed inside the ends of the cylindrical foil tube. The glands fit tightly so that no fixture was needed during welding. The ends of the foil cylinder were brazed to the VCR gland fittings using electron-beam welding at a power of 0.62 A. The resulting membrane module was cleaned with acetone and ethanol, attached to VCR fittings attached to a gas manifold, and the membrane tube lumen was pressurized with argon to 55 psia <1 sccm leakage was observed. The membrane was heated to 300° C. at 1° C./minute. Both sides of the membrane were purged with argon. The membrane lumen was pressurized to 56 psia with flowing hydrogen at 150 sccm and the hydrogen permeation through the membrane was 3.5 sccm.

Example 3

Catalytic Coated Structure (Same as Example 2 Except Changes in Hydrogen Permeability Testing Parameters).

Vanadium and copper were electron-beam melted on a water-cooled copper hearth. The button was flipped and re-melted several times to ensure compositional uniformity of 25 weight % copper. The resulting button was cold rolled into a 5×15 cm (2×5.9 inch) strip with a nominal thickness of 40 μm (1.6 mil). The foil was washed with soap and water, rinsed with methanol, and blown dry with nitrogen. The foil was mounted by clamping the ends of the foil strip, and loaded into the physical vapor deposition (PVD) chamber. After evacuation to $1\cdot10^{-6}$ Torr, argon was bled into the chamber to a pressure of $1.5\cdot10^{-4}$ Torr and the ion-gun (Ion Tech, Teddington, UK) was set to a power of 1 keV and 20–25 mA to ion-mill each side of the foil for 60–90 min. The foil was visually inspected through a window during ion-milling to ensure removal of all remaining macroscopic contaminants. Without breaking vacuum, the chamber was evacuated to $1\cdot10^{-6}$ Torr and a 1000 Å (3.9 microinch) layer of palladium was deposited on each side by e-beam evaporation (Airco-Temescal CV-14 power supply) at 3–5 Å/s. A quartz crystal was used to monitor the thickness of metal deposited.

A piece of the foil was placed into a fixture and welded to itself to form a tube. The bottom half of the fixture was machined from a rectangular block of aluminum and consisted of a 0.3175 cm (0.125 inch) radius trough bored along a block. Holes were tapped into the edges of the block to screw down the top of the fixture. The foil was wrapped around both halves of the copper rod into the shape of a cylinder and placed in the trough. The top of the fixture was a rectangular aluminum block with holes around the edges to put screws through to attach to the bottom fixture. A (0028 inch) slit was machined along the length of the top fixture where the electron beam welded the foil to itself to form a leak-free seam. A 0.635 cm (0.25 inch) diameter copper rod was sliced in half diagonally using wire EDM (electrical discharge machining). By pushing together on the two halves of the copper rod, the foil could be tightened against the fixture, enabling a hermetic seam to be welded. The electron-beam welder was at a power of 0.55 A when the foil was welded to itself to form a 0.635 cm (0.25 inch) cylinder.

The tubing ends of stainless steel 0.635 cm (0.25 inch) VCR glands were machined down and placed inside the ends of the cylindrical foil tube. The glands fit tightly so that no fixture was needed during welding. The ends of the foil cylinder were brazed to the VCR gland fittings using electron-beam welding at a power of 0.62 A. The resulting membrane module was cleaned with acetone and ethanol attached to VCR fittings attached to a gas manifold, and the membrane tube lumen was pressurized with argon to 30 psia with no detectable leakage. The membrane was heated to 350° C. at 1° C./minute. Both sides of the membrane were purged with argon. The membrane lumen was pressurized to 17 psia with flowing hydrogen at 50 sccm and the hydrogen permeation through the membrane was 4 sccm.

Figure 17:
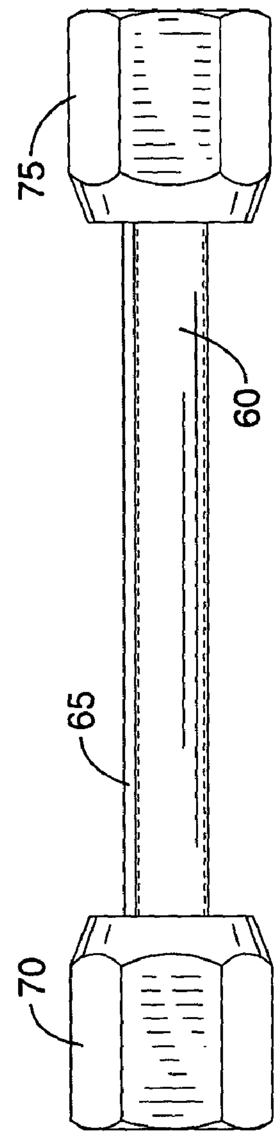
FIG. 17 is side view of the subject tubular membrane produced by the subject method and mounted in suitable "plumbing" adaptors.
Figure 18:
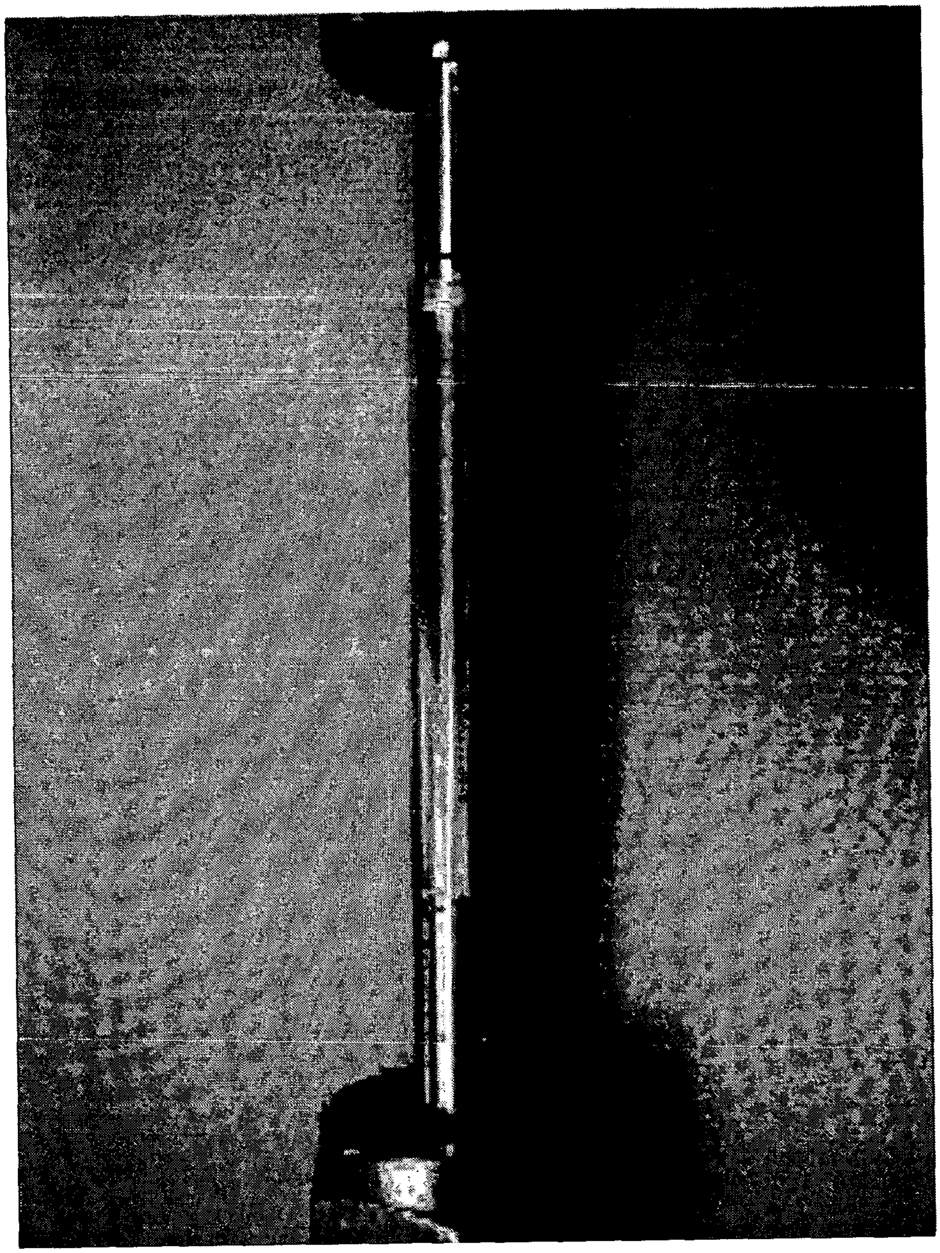
FIG. 18 is a photograph (see FIG. 17 for an equivalent drawing) of the subject tubular membrane produced by the subject method and mounted in suitable "plumbing" adaptors.

FIG. 17 (a drawing) and 18 (an equivalent photograph of the drawing seen in FIG. 17) depict a tubular vanadium-copper membrane 60, with a weld seam 65 (along the overlapping foil edges region 55), produced by the subject method and fitted, on each end, to appropriate "plumbing" fittings 70 and 75 that mate with suitable usage or test devices.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A tubular hydrogen permeable metal membrane produced by a fabrication process comprising:

a) obtaining a metal alloy foil having first and second surfaces;

b) coating each of said first and second foil surfaces with a metal or metal alloy catalytic layer to produce a hydrogen permeable metal membrane;

c) sizing said membrane into a sheet with first and second long edges and first and second end edges;

d) wrapping said membrane around an elongated expandable rod thereby producing a membrane wrapped rod, wherein said first and second long edges align and overlap to facilitate welding of said first long edge to said second long edge thereby producing a welded seam;

e) placing said membrane wrapped rod into a surrounding fixture housing, wherein said aligned and overlapping first and second edges are welding accessible beneath an elongated aperture in said surrounding fixture housing;

f) expanding said elongated expandable rod to generate an expanded rod within said surrounding fixture housing to tighten said membrane about said expanded rod;

g) welding said first and said second long edges to one another producing said seam and generating a tubular membrane; and h) removing said tubular membrane from within said surrounding fixture housing and said expandable rod from within said tubular membrane.

2. A tubular hydrogen permeable metal membrane produced by a fabrication process, according to claim 1, wherein said metal alloy contains a metal selected from a group consisting of Group IVB and VB elements.

3. A tubular hydrogen permeable metal membrane produced by a fabrication process, according to claim 1, wherein said metal alloy contains copper and a metal selected from a group consisting of Group IVB and VB elements.

4. A tubular hydrogen permeable metal membrane produced by a fabrication process, according to claim 1, wherein said metal alloy contains vanadium and copper.

5. A tubular hydrogen permeable metal membrane produced by a fabrication process, according to claim 1, wherein said coating catalytic layer is selected from a group consisting of Pd, Pt, Pd alloy, and Pt alloy.

6. A tubular hydrogen permeable metal membrane produced by a fabrication process, according to claim 1, wherein said elongated expandable rod comprises:

a) a first half having an elongated axis extending between first and second opposing ends and b) a second half having an elongated axis extending between first and second opposing ends, wherein said first half and said second half result from a diagonal separation of said elongated expandable rod into said first and second halves.

7. A tubular hydrogen permeable metal membrane produced by a fabrication process, according to claim 1, wherein said surrounding fixture housing comprises:

a) an upper section having an upper surface and a lower surface;

b) a recess formed in said upper surface of said upper section;

c) a first channel formed in said lower surface of said upper section;

d) said elongated aperture formed within said recess;

e) a lower section having an upper surface and a lower surface;

f) a second channel formed in said upper surface of said lower section; and g) means for securing releasably said upper and said lower sections to one another, thereby surrounding said foil wrapped rod within said first and said second channels with said first and said second long foil overlapping edges welding accessible beneath said elongated aperture.

8. A tubular hydrogen permeable metal membrane produced by a fabrication process comprising:

a) obtaining a metal alloy foil having first and second surfaces, wherein said metal alloy contains a metal selected from a group consisting of Group IVB and VB elements;

b) coating each of said first and second foil surfaces with a metal or metal alloy catalytic layer to produce a hydrogen permeable metal membrane, wherein said coating catalytic layer is selected from a group consisting of Pd, Pt, Pd alloy, and Pt alloy;

c) sizing said membrane into a sheet with first and second long edges and first and second end edges;

d) wrapping said membrane around an elongated expandable rod thereby producing a membrane wrapped rod, wherein said first and second long edges align and overlap to facilitate welding of said first long edge to said second long edge thereby producing a welded seam;

e) placing said membrane wrapped rod into a surrounding fixture housing, wherein said aligned and overlapping first and second edges are welding accessible beneath an elongated aperture in said surrounding fixture housing;

f) expanding said elongated expandable rod to generate an expanded rod within said surrounding fixture housing to tighten said membrane about said expanded rod;

g) welding said overlapping first and said second long edges to one another producing said seam and generating a tubular membrane; and h) removing said tubular membrane from within said surrounding fixture housing and said expandable rod from within said tubular membrane.

9. A tubular hydrogen permeable metal membrane produced by a fabrication process, according to claim 8, wherein said metal alloy further contains copper in addition to said metal selected from a group consisting of Group IVB and VB elements.

10. A tubular hydrogen permeable metal membrane produced by a fabrication process, according to claim 8, wherein said metal alloy contains vanadium as said metal selected from a group consisting of Group IVB and VB elements and further contains copper.

11. A tubular hydrogen permeable metal membrane produced by a fabrication process, according to claim 8, wherein said elongated expandable rod comprises:

a) a first half having an elongated axis extending between first and second opposing ends and b) a second half having an elongated axis extending between first and second opposing ends, wherein said first half and said second half result from a diagonal separation of said elongated expandable rod into said first and second halves.

12. A tubular hydrogen permeable metal membrane produced by a fabrication process, according to claim 8, wherein said surrounding fixture housing comprises:

a) an upper section having an upper surface and a lower surface;

b) a recess formed in said upper surface of said upper section;

c) a first channel formed in said lower surface of said upper section;

d) said elongated aperture formed within said recess;

a) a lower section having an upper surface and a lower surface;

f) a second channel formed in said upper surface of said lower section; and g) means for securing releasably said upper and said lower sections to one another, thereby surrounding said foil wrapped rod within said first and said second channels with said overlapping first and said second long foil edges welding accessible beneath said elongated aperture.

13. A tubular hydrogen permeable metal membrane fabrication process comprising:

a) obtaining a metal alloy foil having first and second surfaces;

b) coating each of said first and second foil surraces with a metal or metal alloy catalytic layer to produce a hydrogen permeable metal membrane;

c) sizing said membrane into a sheet with first and second long edges and first and second end edges;

d) wrapping said membrane around an elongated expandable rod thereby producing a membrane wrapped rod, wherein said first and second long edges align and overlap to facilitate welding of said first long edge to said second long edge thereby producing a welded seam;

e) placing said membrane wrapped rod into a surrounding fixture housing, wherein said aligned and overlapping first and second edges are accessible beneath an elongated aperture in said surrounding fixture housing;

f) expanding said elongated expandable rod to generate an expanded rod within said surrounding fixture housing to tighten said membrane about said expanded rod;

g) welding said first and said second overlapping long edges to one another producing said seam and generating a tubular membrane; and h) removing said tubular membrane from within said surrounding fixture housing and said expandable rod from within said tubular membrane.

14. A tubular hydrogen permeable metal membrane fabrication process, according to claim 13, wherein said metal alloy contains a metal selected from a group consisting of Group IVB and VB elements.

15. A tubular hydrogen permeable metal membrane fabrication process, according to claim 13, wherein said metal alloy contains copper and a metal selected from a group consisting of Group IVB and VB elements.

16. A tubular hydrogen permeable metal membrane fabrication process, according to claim 13, wherein said metal alloy contains vanadium and copper.

17. A tubular hydrogen permeable metal membrane fabrication process, according to claim 13, wherein said coating catalytic layer is selected from a group consisting of Pd, Pt, Pd alloy, and Pt alloy.

18. A tubular hydrogen permeable metal membrane fabrication process, according to claim 13, wherein said elongated expandable rod comprises:

a) a first half having an elongated axis extending between first and second opposing ends and b) a second half having an elongated axis extending between first and second opposing ends, wherein said first half and said second half result from a diagonal separation of said elongated expandable rod into said first and second halves.

19. A tubular hydrogen permeable metal membrane fabrication process, according to claim 13, wherein said surrounding fixture housing comprises:

a) an upper section having an upper surface and a lower surface;

b) a recess formed in said upper surface of said upper section;

c) a first channel formed in said lower surface of said upper section;

d) said elongated aperture formed within said recess;

e) a lower section having an upper surface and a lower surface;

f) a second channel formed in said upper surface of said lower section; and g) means for securing releasably said upper and said lower sections to one another, thereby surrounding said foil wrapped rod within said first end said second channels with said first and said second long foil overlapping edges welding accessible beneath said elongated aperture.

20. A tubular hydrogen permeable metal membrane fabrication process comprising:

a) obtaining a metal alloy foil having first and second surfaces, wherein said metal alloy contains a metal selected from a group consisting of Group IVB and VB elements;

b) coating each of said first and second foil surfaces with a metal or metal alloy catalytic layer to produce a hydrogen permeable metal membrane, wherein said coating catalytic layer is selected from a group consisting of Pd, Pt, Pd alloy, and Pt alloy;

c) sizing said membrane into a sheet with first and second long edges and first and second end edges;

d) wrapping said membrane around an elongated expandable rod thereby producing a membrane wrapped rod, wherein said first and second long edges align and overlap to facilitate welding of said first long edge to said second long edge thereby producing a welded seam;

e) placing said membrane wrapped rod into a surrounding fixture housing, wherein said aligned and overlapping first and second edges are welding accessible beneath an elongated aperture in said surrounding fixture housing;

f) expanding said elongated expandable rod to generate an expanded rod within said surrounding fixture housing to tighten said membrane about said expanded rod;

g) welding said first and said second long edges to one another producing said seam and generating a tubular membrane; and h) removing said tubular membrane from within said surrounding fixture housing and said expandable rod from within said tubular membrane.

21. A tubular hydrogen permeable metal membrane fabrication process, according to claim 20, wherein said metal alloy further contains copper in addition to said metal selected from a group consisting of Group IVB and VB elements.

22. A tubular hydrogen permeable metal membrane fabrication process, according to claim 20, wherein said metal alloy contains vanadium and copper.

23. A tubular hydrogen permeable metal membrane fabrication process, according to claim 20, wherein said elongated expandable rod comprises:

a) a first half having an elongated axis extending between first and second opposing ends and b) a second half having an elongated axis extending between first and second opposing ends, wherein said first half and said second half result from a diagonal separation of said elongated expandable rod into said first and second halves.

24. A tubular hydrogen permeable metal membrane fabrication process, according to claim 20, wherein said surrounding fixture housing comprises:

a) an upper section having an upper surface and a lower surface;

b) a recess formed in said upper surface of said upper section;

c) a first channel formed in said lower surface of said upper section;

d) said elongated aperture formed within said recess;

e) a lower section having an upper surface and a lower surface;

f) a second channel formed in said upper surface of said lower section; and g) means for securing releasably said upper and said lower sections to one another, thereby surrounding said foil wrapped rod within said first and said second channels with said first and said second long foil overlapping edges welding accessible beneath said elongated aperture.

25. A tubular membrane fabrication fixture comprising:

a) an elongated expandable rod comprising:

i) a first half having an elongated axis extending between first and second opposing ends and ii) a second half having an elongated axis extending between first and second opposing ends, wherein said first half and said second half result from a diagonal separation of said elongated expandable rod into said first and second halves and b) a surrounding fixture housing comprising:

i) an upper section having an upper surface and a lower surface;

ii) a recess formed in said upper surface of said upper section;

iii) a first channel formed in said lower surface of said upper section;

iv) an elongated aperture formed within said recess;

v) a lower section having an upper surface and a lower surface;

vi) a second channel formed in said upper surface of said lower section; and vii) means for securing releasably said upper and said lower sections to one another, wherein said elongated expandable rod fits with said first and second channels.

* * * * *